UNITED STATES PATENT OFFICE.

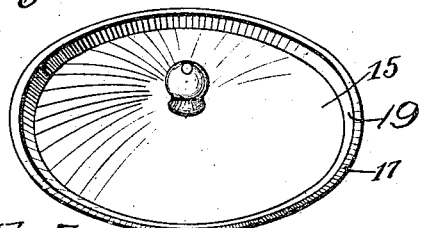
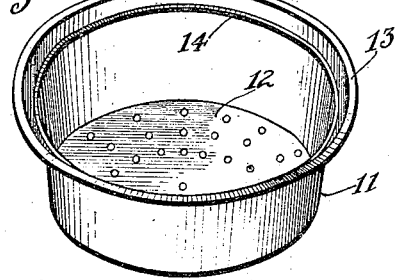
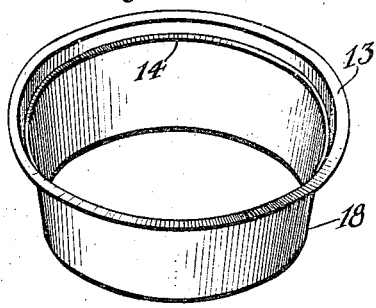
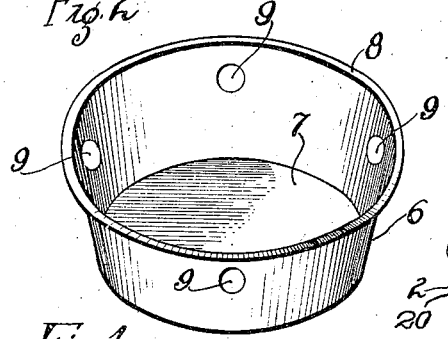
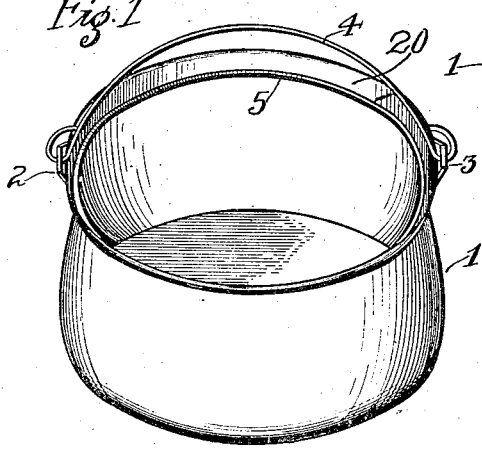
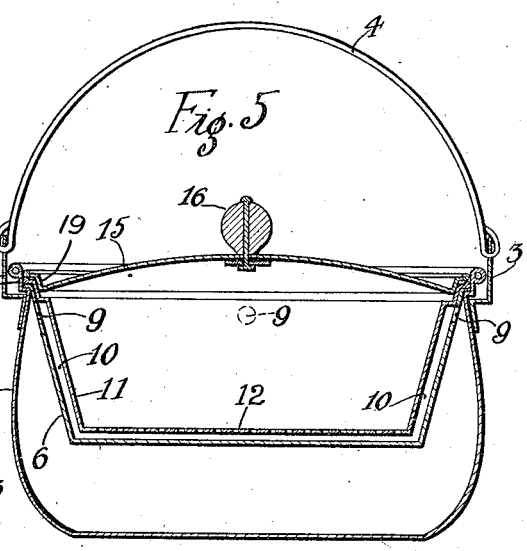

OLAF TOLLAGSEN, OF CHICAGO, ILLINOIS.

COOKING VESSEL.

1,263,004.  Specification of Letters Patent.  Patented Apr. 16, 1918.

Application filed September 27, 1915. Serial No. 52,951.

*To all whom it may concern:*

Be it known that I, OLAF TOLLAGSEN, a citizen of the United States, residing at Chicago, in the county of Cook and State of Illinois, have invented a certain new and useful Improvement in Cooking Vessels, of which the following is a full, clear, concise, and exact description, reference being had to the accompanying drawings, forming a part of this specification.

My invention relates to cooking vessels and more particularly to a cooking vessel for preparing a food substance by steaming.

The object of the invention is to provide an improved and simplified cooking vessel for steaming food preparations. Another object of the invention is to provide a steaming vessel for steaming or cooking food materials which is characterized by ease and convenience of cleaning and handling, certainty in action and low cost of manufacture.

The vessel of my invention provides an interchangeable structure which serves for a number of purposes and thus takes the place of a number of separate vessels.

I shall now describe in connection with the accompanying drawings which form a part of the present specification one embodiment of my invention.

Figure 1 is a perspective view of the main or water containing vessel;

Fig. 2 is a perspective view of the steam directing pan;

Fig. 3 is a similar view of the food containing or inner pan;

Fig. 4 is a similar view of a top or cover for closing the pan;

Fig. 3ª is a perspective view of a food containing pan which is alternative in form to that shown in Fig. 3; and Fig. 5 is a cross-section of the parts in assembled condition.

The main or outer vessel 1 is preferably formed in the shape of a kettle having ears 2 and 3 and a bail or handle 4 for suitable handling or manipulation. This vessel is open at the top and is provided with an annular offset portion forming a shoulder 5, the upper annular margin of the vessel is disposed vertically to form a flange 20. The steam directing pan 6, shown in Fig. 2, comprises a shell which is generally conical in form, closed by a bottom part 7 which prevents water from being splashed up when the same is boiling. The body of this pan is provided with a peripheral shoulder or flange 8 at the top so that the same may engage the ledge 5 in the main vessel 1. Adjacent the top of the pan 6 but below the flange 8 a number of holes 9 are formed in the side walls of the pan. These holes serve to admit steam which is formed in the main vessel 1 and to direct it into the space 10 formed between the inner and outer pans. The inner pan 11 comprises conical side walls and a perforated bottom 12. The side walls are provided with a flange 13 at the top which is substantially the same outside diameter as the flange 8 of the pan 6. An annular shoulder or offset 14 is formed in the side walls so as to provide the space 10 between the inner and outer pans.

The cover 15 which is provided with a suitable handle 16 has an outer flange 17 adapted to close off the pans 6 and 11 when they are in place in the kettle 1 or to close off the top of the kettle in case the pans are not used.

The cover 15 is provided with a conical depression 19 back of the flange 17 which forms a taper fit with the walls of the pan 11. If the pan 11 is removed the cover drops down and forms a similar fit with the pan 6, and when both pans are removed, the cover drops down and engages the shoulder or offset side, thus closing the vessel 1 out at all times, whether the pans 6 and 11 are employed or not.

I have shown an alternative form of the inner pan in Fig. 3ª. This pan 18 is provided with the side walls, a flange 13 and a shoulder 14, similar to the corresponding parts of the pan 11. However, the pan 18 has no bottom thereto.

The operation of the device will now be apparent from the above description. Sufficient water is placed in the main kettle part 1 to steam the food product. It is desirable, however, that the level of the water be kept below the bottom of the pan 6 in order to expose as large a steaming surface as possible. When this water is brought to the steaming temperature, the steam will pass through the openings 9 in the pan 6 down the space 10 heating the food which may be contained within the food containing pan 11, and into the pan 11 through the bottom thereof. The perforated bottom 12 serves to distribute the steam more evenly over the bottom of the food containing pan.

In the case of preparing oat meal the same is placed upon the bottom 12 and the steam arises through the perforations therein, thus steaming the material.

If it is desired to pasteurize milk the same is placed within the pan 6 and the pan 18 which has an open bottom is employed. In this case the steam passes through the openings 9 into the space 10 and up through the liquid, in this case milk, around the bottom of the pan 18. The passage of the steam or vapor causes sufficient agitation to heat all of the parts evenly.

It will be noticed that the main vessel 1 with the cover 15 may be employed for other purposes by merely omitting the pans 6 and 11. It is apparent that the cover and either or both pans may be used at any time and thus the vessel serves the function of a number of different vessels.

From the above it can be seen that I have provided a very simple and effective cooking utensil of the class described. In practice I prefer to construct the various parts of aluminum although the material from which the structure is formed is not of the essence of the invention.

I wish it to be understood that I contemplate passage of the steam through the central part of the outer pan and down below the material to be steamed as well as around the outer parts thereof, as this is merely an alternative construction.

The parts are all readily separable and can be cleaned with a minimum of effort.

What I claim as new and desire to protect by Letters Patent is the following:

The combination of a main container, the upper margin of which is formed with a vertical annular flange, an annular shoulder, an outer conical container having an annular radial flange on its upper margin, and the peripheral wall thereof having openings in the upper edge, an inner conical container having a perforated bottom and provided with an annular offset portion terminating in a radial flange to seat upon the radial flange of said outer container, said offset maintaining said inner and outer containers in spaced relation and a cover having an annular conical flange to engage the flanges of said main container or the outer and inner container.

In witness whereof, I hereunto subscribe my name this 25th day of September A. D. 1915.

OLAF TOLLAGSEN.

Copies of this patent may be obtained for five cents each, by addressing the "Commissioner of Patents, Washington, D. C."